United States Patent
Rasmussen (10) Patent No.: US 9,496,717 B2
(45) Date of Patent: Nov. 15, 2016

(54) SYSTEM AND METHOD FOR CONNECTING A CONVERTER TO A UTILITY GRID

(75) Inventor: Tonny Wederberg Rasmussen, Olsted (DK)

(73) Assignee: Technical University of Denmark, Lyngby (DK)

( * ) Notice: Subject to any disclaimer, the term of this patent is extended or adjusted under 35 U.S.C. 154(b) by 1224 days.

(21) Appl. No.: 13/125,067

(22) PCT Filed: Oct. 28, 2009

(86) PCT No.: PCT/DK2009/050282
§ 371 (c)(1),
(2), (4) Date: Jun. 21, 2011

(87) PCT Pub. No.: WO2010/048961
PCT Pub. Date: May 6, 2010

(65) Prior Publication Data
US 2011/0245990 A1  Oct. 6, 2011

Related U.S. Application Data

(60) Provisional application No. 61/230,311, filed on Jul. 31, 2009.

(30) Foreign Application Priority Data

Oct. 28, 2008 (DK) .............................. 2008 01482

(51) Int. Cl.
*G06F 1/26* (2006.01)
*H02J 3/40* (2006.01)
(Continued)

(52) U.S. Cl.
CPC .. *H02J 3/40* (2013.01); *H02J 3/48* (2013.01); *H02J 3/50* (2013.01)

(58) Field of Classification Search
CPC .......................................................... G06F 1/26
USPC .............................................................. 307/14
See application file for complete search history.

(56) References Cited

U.S. PATENT DOCUMENTS 5,225,712 A 7/1993 Erdman
5,369,353 A 11/1994 Erdman
(Continued)

FOREIGN PATENT DOCUMENTS

GB 2432267 5/2007
GB 2432267 A * 5/2007 .......... H02M 5/4585
(Continued)

OTHER PUBLICATIONS

Analysis and Design of Fully Digital and Direct Current Controlled Voltage Source Converters Connected to the Grid, Guopeng Zhao, Jun. 18-22, 2006.*

(Continued)

*Primary Examiner* — Rexford Barnie
*Assistant Examiner* — Daniel Kessie
(74) *Attorney, Agent, or Firm* — Dinsmore & Shohl LLP (57) ABSTRACT

The present invention relates to a system and a method for connecting and/or interfacing a converter, such as a switched mode converter, to an electrical power grid. The invention furthermore relates to control of the converter. The present invention facilitates that the point of common coupling (PCC) between a utility grid and a converter is provided at the converter output. This facilitates that a converter, and thereby an electrical power source, may be connected to an electrical power grid without use of an inductor, such as a reactor.

13 Claims, 4 Drawing Sheets (51) Int. Cl.
 H02J 3/48 (2006.01)
 H02J 3/50 (2006.01)

(56) References Cited

U.S. PATENT DOCUMENTS

| | | | |
|---|---|---|---|
| 5,526,252 | A | 6/1996 | Erdman |
| 5,892,352 | A * | 4/1999 | Kolar et al. ........ H02M 3/1584 323/213 |
| 7,141,321 | B2 * | 11/2006 | McArthur et al. .... B60L 11/184 180/65.31 |
| 7,432,686 | B2 * | 10/2008 | Erdman et al. ....... F03D 7/0224 290/40 R |
| 7,692,323 | B2 * | 4/2010 | Ichinose et al. ........ F03D 7/026 290/44 |
| 7,728,452 | B2 * | 6/2010 | Arinaga et al. ....... F03D 7/0224 290/44 |
| 2005/0225908 | A1 | 10/2005 | Datta |
| 2006/0002157 | A1 | 1/2006 | Petter et al. |
| 2006/0034108 | A1 | 2/2006 | Johnson |
| 2007/0108771 | A1 | 5/2007 | Jones et al. |
| 2010/0142237 | A1 * | 6/2010 | Yuan et al. ............. H02J 3/386 363/97 |

FOREIGN PATENT DOCUMENTS

| | | |
|---|---|---|
| GB | 2451463 | 2/2009 |
| JP | 5181552 | 7/1993 |
| RU | 2265947 | 12/2005 |
| WO | WO 95/05697 | 2/1995 |
| WO | 2005/048433 | 5/2005 |
| WO | 2006/137636 | 11/2008 |

OTHER PUBLICATIONS

Blaabjerg et al., Oct. 1, 2006, "Overview of control and grid synchronization for distributed power generation systems", IEEE Transactions on Industrial Electronics, IEEE Service Center, Piscataway, NJ, USA, vol. 53, No. 5, pp. 1398-1409.

Chinchilla et al., Jul. 1, 2006, "Power limits of grid-connected modern wind energy systems", Renewable Energy, Pergamon Press, Oxford, GB, vol. 31, No. 9, pp. 1455-1470.

Eby-Garcia et al., Jun. 15, 2008, "Extended direct power control of a three-level Neutral Point CLamped Voltage Source Inverter with unbalanced voltages", Power Electronics Specialists Conference, PESC 2008, IEEE, IEEE, Piscataway, NJ, USA, pp. 3396-3400.

Implementation and control of grid connected AC-DC-AC power converter for variable speed wind energy conversion system, APEC 2003. 18th Annual IEEE Applied Power Electronics Conference and Exposition. Miami Beach, FL., Feb. 9-13.

Jung at al., Nov. 1, 2007, "A low cost utility Interactive inverter for residential fuel cell generation"; IEEE Transactions on Power Electronics, IEEE Service Center, Piscataway, NJ, US, vol. 22, No, 6, pp. 2293-2298.

Lai et al., 2008, "Power electronics for alternative energy", APEC08 Seminar, Twenty Third Annual Applied Power Electronics Conference, IEEE Power Electronics Society, pp. 62-63.

Liang et al, Jun. 23, 2002, "Evaluation of repetitive control for power quality improvement of distributed generation", 33rd Annual IEEE Power Electronics Specialists Conference, PESC 2002. Conference Proceedings, Cairns, QLD, AU, New York, NY: IEEE, US, vol. 4, pp. 1803-1808.

Pena et al., 1996, "Doubly fed Induction generator using back-to-back PWM converters and its applications to variable-speed wind-energy generation", IEE Proc. Electric. Power Appl., 143, pp. 231-241.

Prodanovic et al, Nov. 5, 2002, "Control of power quality in Inverter-based distributed generation", IECON—2002. Proceedings of the 28th Annual Conference of the IEEE Industrial Electronics Society. Sevilla, Spain, IEEE, New York, NY, US, vol. 2, pp. 1185-1189.

Rothenhagen et al., Sep. 1, 2008, "Grid connection of multi-megawatt clean wave energy power plant under weak grid condition", Power Electronics and Motion Control Conference, 2008, EPE-PEMC 2008, 13th IEEE, Piscataway, NJ, US, pp. 1904-1910.

Tao et al., Sep. 1, 2007, "Control of grid-interactive inverters as used in small distributed generators", Industry Applications Conference, 42nd IAS Annual Meeting, Conference Record of the 2007 IEEE, IEEE, PI, pp. 1574-1581.

Zeng at al., Jun. 20 ,2004, "SVPWM-based current controller with grid harmonic compensation for three-phase grid-connected VSI", Power Electronics Specialists Conference, PESC 2004, IEEE 35th Annual Aachen, DE, Piscataway, NJ, USA, IEEE, US, pp. 3494-3500.

* cited by examiner

SYSTEM AND METHOD FOR CONNECTING A CONVERTER TO A UTILITY GRID

CROSS-REFERENCE TO RELATED APPLICATIONS

This application is the U.S. National Phase of PCT/DK20091050282 filed Oct. 28, 2009, which claims priority of Danish Patent Application PA 2008 01482 filed Oct. 28, 2008, and U.S. Provisional Patent Application 61/230,311 filed Jul. 31, 2009.

The present invention relates to a system and a method for connecting and/or interfacing a converter, such as a switched mode converter, to an electrical power grid. The invention furthermore relates to control of the converter. This invention facilitates connection of a converter to a utility grid without the use of a reactor.

BACKGROUND OF INVENTION

Use of renewable energy resources is widely increasing globally. Renewable energy sources such as wind energy, wave energy, solar energy, fuel cells, and the like are characterized in that the energy supply is not constant, for example the wind and sunlight are almost constantly varying. This provides a challenge when integrating renewable energy sources into power supply grids, such as an electrical power grid (utility grid), wherein the requirements to real and reactive power, frequency, voltage and the like typically will be precisely defined. Therefore a plurality of methods has been developed to integrate and synchronize these variable energy sources into the electrical power grid. A widespread method is to use a converter to convert the variable electrical energy signal from the source to a constant AC current signal suited for the electrical power grid. The use of converters is common in relation to wind energy due to the type of generators used in wind turbines. Regulation and control of modern converters are typically based on or are variations of the regulation described by Pena, C et al. (1996) *Doubly fed induction generator using back-to-back PWM converters and its applications to variable-speed wind-energy generation*, IEE Proc.-Electr. Power Appl., 143, 231-241.

Due to the regulation in a converter an excess of reactive power is created and a commonly used method of regulating this reactive power is to apply a reactor (inductor) between the converter and the grid. The reactor is then said to consume the reactive power (at least a part of it) from the converter by acting as a filter. A reactor typically comprises an iron core with copper windings and the physical requirements scales with the current flowing trough the reactor. Thus, larger maximum current of the reactor requires larger iron core and larger (and/or added) copper windings. If the converter is used to connect an electrical energy source, such as a wind turbine, to the utility grid, the requirements to the size of the reactor scales with the power of the energy source, i.e. large power sources require large reactors to handle the large currents.

SUMMARY OF THE INVENTION

In order to lower the cost per produced kWh and increase the efficiency of renewable energy sources the power sources must grow in size. This is the case within wind energy where the size of and the output from wind turbines is constantly growing. However, when the capacity of an energy source connected to the utility grid is increasing so does the delivered AC current from the source, thereby increasing the physical requirements to the reactor. Modern electrical energy sources with converter systems require reactors of substantial size, e.g. cubic meters of iron and copper resulting in a substantial weight, possibly more than one ton, to connect the converter to the utility grid. And reactor requirements for future electrical energy sources will only grow in size.

A first object of the invention is to provide a new connection and/or a new interface between a converter and an electrical power grid, i.e. a utility grid. This is achieved by a method for connecting a converter to an electrical power grid with predefined operating conditions in terms of real power P and/or reactive power Q, said method comprising the steps of:

a) providing a grid reference signal by measuring the amplitude and the phase of the grid voltage,
b) setting an internal converter voltage to be the grid reference signal,
c) connecting the converter to the grid,
d) measuring a current from the converter to the grid,
e) calculating the real power p(t) and/or the reactive power q(t) exchanged between the converter and the grid based on the internal converter voltage and the current obtained in step d),
f) if said real power p(t) is different from P and/or if said reactive power q(t) is different from Q, the converter is adjusted by changing the phase and/or the amplitude of the internal converter voltage, and
g) repeating steps d) to f) until the real power p(t) equals P and/or the reactive power q(t) equals Q, thereby interfacing the converter with the electrical power grid.

The invention further covers a system for connecting a converter to an electrical power grid with predefined operating conditions in terms of real power P and/or reactive power Q, said system comprising:

means for providing a grid reference signal by measuring the amplitude and the phase of the grid voltage,
means for setting an internal converter voltage to be the grid reference signal,
means for connecting the converter to the grid,
means for measuring a current from the converter to the grid,
means for calculating the real power p(t) and/or the reactive power q(t) exchanged between the converter and the grid based on the internal converter voltage and the current obtained in step d),
means for determining whether said real power p(t) is different from P and/or whether said reactive power q(t) is different from Q, and
means for adjusting the converter by changing the phase and/or the amplitude of the internal converter voltage.

The means for adjusting the converter is provided to adjust for any differences between p(t) and P and/or q(t) and Q.

A second object of the invention is to be able to control a converter connected to an electrical power grid. This is achieved by a method for controlling a converter connected to an electrical power grid, said electrical power grid and/or converter having operating conditions in terms of real power P and/or reactive power Q, said method comprising the steps of:

a) measuring a current from the converter to the grid,
b) calculating the real power p(t) and/or the reactive power q(t) exchanged between the converter and the grid based on an internal converter voltage and the current obtained in step a), c) if said real power p(t) is different from P and/or if said reactive power q(t) is different from Q, the converter is adjusted by changing phase and/or amplitude of the internal converter voltage, and d) repeating steps a) to c) until the real power p(t) equals P and/or the reactive power q(t) equals Q, thereby maintaining synchronization between the converter and the electrical power grid.

In a further embodiment of the invention the above described steps a) to c) or a) to d) may be continually repeated to correct for variations in operating conditions in terms of P and/or Q.

The invention further covers a system for controlling a converter connected to an electrical power grid, said electrical power grid and/or converter having operating conditions in terms of real power P and/or reactive power Q, said system comprising:

means for measuring a current from the converter to the grid, means for calculating the real power p(t) and/or the reactive power q(t) exchanged between the converter and the grid based on an internal converter voltage and the measured current, means for determining whether said real power p(t) is different from P and/or whether said reactive power q(t) is different from Q, and means for adjusting the converter by changing phase and/or amplitude of the internal converter voltage.

The means for adjusting the converter is provided to adjust for any differences between p(t) and P and/or q(t) and Q.

The first embodiment of the invention covers the connection of the converter to the grid whereas the second embodiment of the invention covers the control of the converter after the connection has been provided. However, these two mentioned embodiments of the invention evolve around the same inventive principle, i.e. the new regulation of the converter based on the measured current and the internal converter voltage. Naturally the invention also relates to an embodiment covering the connection of the converter to the grid and the subsequent control of the converter after connection has been provided.

A further object of the invention is to provide this converter connection, interface and/or control with reduced physical requirements to the reactor, preferably the converter should be connected to the electrical power grid without the use of a reactor, i.e. an inductor.

When the converter is furthermore connected to at least one electrical power source a connection between an electrical power source and an electrical power grid is provided by the system and method according to the invention. Thereby an electrical power source can be connected to an electrical power grid without the use of a reactor.

In the converters and converter regulations known in the art the point of common coupling (PCC) between an electrical power source and a utility grid is provided by means of a converter and a reactor between the converter and the grid. The PCC between the electrical power source and utility grid is then the connection between the reactor and the grid. Essentially the present invention facilitates that the PCC between the power grid and the converter is provided at the converter output. It is this fact that facilitates that a converter, and thereby an electrical power source, may be connected to an electrical power grid without use of an inductor, such as a reactor. However, if the converter regulation as taught by the present invention is applied to a converter, an inductor may still be provided between the converter and the grid. In this case the PCC is provided at the converter side of the reactor.

In a further aspect the invention relates to a system having means for carrying out the methods described above. Said system may be any suitable system, such as a computer comprising code portions constituting means for executing the methods as described above.

In yet a further aspect the invention relates to a data carrier comprising computer code portions constituting means for executing the methods as described above.

DEFINITIONS

Reactor/Inductor

Inductors are used extensively in analog circuits and signal processing. Inductors in conjunction with capacitors and other components form tuned circuits which can emphasize or filter out specific signal frequencies. This can range from the use of large inductors as chokes in power supplies, which in conjunction with filter capacitors remove residual hum or other fluctuations from the direct current output, to such small inductances as generated by a ferrite bead or torus around a cable to prevent radio frequency interference from being transmitted down the wire. Smaller inductor/capacitor combinations provide tuned circuits used in radio reception and broadcasting, for instance.

Inductors are also employed in electrical transmission systems, where they are used to depress voltages from lightning strikes and to limit switching currents and fault current. In this field, they are more commonly referred to as reactors.

As inductors tend to be larger and heavier than other components, their use has been reduced in modern equipment; solid state switching power supplies eliminate large transformers, for instance, and circuits are designed to use only small inductors, if any; larger values are simulated by use of gyrator circuits.

Power factor correction brings the power factor, i.e. the ratio of real and reactive power in a system, of an AC power circuit closer to 1 by supplying reactive power of opposite sign, adding capacitors or inductors which act to cancel the inductive or capacitive effects of the load, respectively. Sometimes, when the power factor is leading due to capacitive loading, inductors (also known as reactors in this context) are used to correct the power factor. In the electricity industry, inductors are said to consume reactive power and capacitors are said to supply it, even though the reactive power is actually just moving back and forth between each AC cycle. Thus, in a system with inductive characteristics, i.e. the reactive power is ahead of the real power, an inductor (reactor) is applied to consume the reactive power to adjust the power factor of the system.

Q Factor

An ideal inductor will be lossless irrespective of the amount of current through the winding. However, typically inductors have winding resistance from the metal wire forming the coils. Since the winding resistance appears as a resistance in series with the inductor, it is often called the series resistance. The inductor's series resistance converts electrical current through the coils into heat, thus causing a loss of inductive quality. The quality factor (or Q) of an inductor is the ratio of its inductive reactance to its resistance at a given frequency, and is a measure of its efficiency. The higher the Q factor of the inductor, the closer it approaches the behaviour of an ideal, lossless, inductor.

The Q factor of an inductor can be found through the following formula, $$Q = \frac{\omega L}{R},$$

where R is internal electrical resistance of the inductor and ωL is Capacitive or Inductive reactance at resonance.

By using a ferromagnetic core, the inductance is greatly increased for the same amount of copper, multiplying up the Q. Metal cores however also introduce losses that increase with frequency. A grade of core material is chosen for best results for the frequency band. At VHF or higher frequencies an air core is likely to be used.

Inductors wound around a ferromagnetic core may saturate at high currents, causing a dramatic decrease in inductance (and Q). This phenomenon can be avoided by using a (physically larger) air core inductor. A well designed air core inductor may have a Q of several hundred.

A Phase-Locked Loop or Phase Lock Loop (PLL)

A PLL is a control system that generates a signal that has a fixed relation to the phase of a "reference" signal. A phase-locked loop circuit responds to both the frequency and the phase of the input signals, automatically raising or lowering the frequency of a controlled oscillator until it is matched to the reference in both frequency and phase. A phase-locked loop is an example of a control system using negative feedback. In simpler terms, a PLL compares the frequencies of two signals and produces an error signal which is proportional to the difference between the input frequencies. The error signal is used to drive a voltage-controlled oscillator (VCO) which creates an output frequency. The output frequency is fed through a frequency divider back to the input of the system, producing a negative feedback loop. If the output frequency drifts, the error signal will increase, driving the frequency in the opposite direction so as to reduce the error. Thus the output is locked to the frequency at the other input. This input is called the reference and is derived from a crystal oscillator, which is very stable in frequency.

Point of Common Coupling

A point of common coupling (PCC) in a utility grid is a point where a converter (connected to a current source) is connected to the grid. Thus, the PCC is the point of interface between a utility grid and a current source, i.e. an electrical power source. A PCC can therefore be the interface between two different systems, e.g. the grid operator/owner and the operator/owner of the current source, such as a plurality of wind turbines. At the grid side of the PCC the administrator of the grid is responsible for the operation of the grid. The grid administrator therefore determines the connection and operating conditions for the converter. At the converter side of the PCC the administrator (e.g. the owner/operator) is then responsible of meeting these connection and operating conditions.

The goal of the current source is to deliver real power P to the grid. Typically the grid administrator will provide operating conditions in terms of a reactive power reference Q that must be met on the converter side. The converter is then the interface between the current source and the grid that balances P and/or Q. Regulation of the converter must continually monitor that the real power p(t) exchanged between the converter and the grid is consistent with the real power P delivered by the current source and that the reactive power q(t) exchanged between the converter and the grid is consistent with the operating conditions in terms of reactive power Q of the utility grid. Thus, typically the converter will balance a P reference on the DC side of the converter and a Q reference on the AC side of the converter. The present invention uses measurable parameters of the converter, i.e. the current in each phase and the internal converter voltage, to calculate p(t) and q(t) for each sampling t. Knowing these values and comparing to the requested P and Q references the converter may be continually adjusted by adjusting the phase and amplitude of the internal converter voltage.

DETAILED DESCRIPTION OF THE INVENTION

Normally when an electrical energy source is interfaced with the utility grid through a converter, a reactor will consume the reactive power between the converter and the grid. Or as written above: in a system with inductive characteristics, i.e. the reactive power is ahead of the real power, an inductor (reactor) is applied to consume the reactive power to adjust the power factor of the system. This invention demonstrates that the synchronization/balancing of the real power and the reactive power between the converter and the grid can be handled in other ways. As described herein a grid reference signal is obtained. This grid reference signal must be obtained before the converter and/or the reactor and/or any inductive element is connected. The grid reference signal is preferably provided by at least one measurement providing the voltage of the utility grid, preferably in terms of amplitude and phase. The grid reference signal is subsequently stored as an internal reference. This can preferably be provided by a Phase Locked Loop (PLL), which is perfectly suited to lock the grid reference signal as an internal reference. Thus, prior to connecting a converter the grid reference signal maybe locked by a Phase Locked Loop.

The grid reference signal is the starting point for the converter, i.e. the internal converter voltage is set to be the grid reference signal (in terms of phase and amplitude).

Next step is to connect the converter to the utility grid and thereby also connecting the electrical energy source to the utility grid. Subsequently the electrical energy source must be interfaced and synchronized with the utility grid. This is preferably provided by adjusting the internal converter voltage. This synchronization procedure is preferably provided by measuring the AC current flowing from the converter to the grid. For a multi-phase system, such as a three-phase system, the current is measured in each phase. Knowing this current and the internal converter voltage the real power and the reactive power exchanged between the converter and the grid can be calculated. If the real power and the reactive power are different from the operating conditions P and Q provided by and/or defined by the utility grid and/or the current source, the voltage of the converter characteristics of the converter can be adjusted by changing the phase and/or the amplitude of the internal converter voltage. The procedure starting with measuring the current flowing from the converter to the grid and ending with adjusting the internal converter voltage can be repeated until the real and reactive power from the converter equals the requested P and Q. Thereby the converter and the electrical energy source has been interfaced and synchronized with the utility grid. With appropriate and substantially high driving frequencies of the components involved in this synchronization procedure, it can be completed within milliseconds, such as for below 200 ms, such as below 100 ms, such as below 75 ms, such as below 60 ms, such as below 50 ms, such as below 40 ms, such as below 30 ms, such as below 20 ms, such as below 20 ms. Typically the synchronization procedure will be completed with approx. 40 to 60 ms.

Once the converter has been connected and interfaced with a utility grid according to the above described method, the converter can subsequently be controlled by the method described in the second embodiment of the invention. A control loop is then applied wherein at first the current from the converter to the grid is measured. Secondly the real and reactive power exchanged between the converter and the grid is calculated. This calculation can be based on the current measured in the first step and the internal converter voltage. The third step is to compare the calculated real and reactive power with the requested P and Q. If different the voltage of the converter is adjusted by changing the phase and/or amplitude of the internal converter voltage. These three steps are repeated until the real and/or reactive power equals the requested P and Q. This control loop can be provided automatically, for example by incorporating a PI control loop. Thus, in a preferred embodiment of the invention a plurality of the involved steps are provided automatically, such as by a computer control.

For calculating the real power and reactive power in a three-phase system the direct-quadrature-zero (or dq0 or dqo) transformation or zero-direct-quadrature (or 0dq or odq) transformation may be applied. This may often be referred to as Park's transformation. It is a mathematical transformation used to simplify the analysis of three-phase circuits. In the case of balanced three-phase circuits, application of the dqo transform reduces the three AC quantities to two DC quantities. The dqo transformation can be thought of in geometric terms as the projection of the three separate sinusoidal phase quantities (voltages or currents) onto two axes rotating with the same angular velocity as the sinusoidal phase quantities.

A conceptually similar transformation more suitable within applications of three-phase converters is the $\alpha\beta\gamma$ transformation. In particular $\alpha\beta\gamma$ transformation is suitable for the generation of the reference signal used for space vector modulation control of three-phase converters. Whereas the dqo transform is the projection of the phase quantities (voltages or currents) onto a rotating two-axis reference frame, the $\alpha\beta\gamma$ transform can be thought of as the projection of the phase quantities onto a stationary two-axis reference frame, i.e. two stationary axes: the alpha axis and the beta axis.

Thus, according to one embodiment of the invention the internal voltage reference of the converter (i.e. the internal converter voltage) is transformed by means of an $\alpha\beta\gamma$ transformation according to the following formula:

$$\begin{bmatrix} e_\alpha(t) \\ e_\beta(t) \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} e_a(t) \\ e_b(t) \\ e_c(t) \end{bmatrix}$$

Thus, the three-phase internal converter voltage is expressed in a two-axis reference frame $\alpha$ and $\beta$. A similar transformation is provided for the measured current running between the converter and the grid:

$$\begin{bmatrix} i_\alpha(t) \\ i_\beta(t) \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} i_a(t) \\ i_b(t) \\ i_c(t) \end{bmatrix}$$

The real power p(t) and reactive power q(t) can then be calculated to sampling time t as:

$$\begin{bmatrix} p(t) \\ q(t) \end{bmatrix} = \frac{3}{2} \begin{bmatrix} e_\alpha(t) & e_\beta(t) \\ -e_\beta(t) & e_\alpha(t) \end{bmatrix} \cdot \begin{bmatrix} i_\alpha(t) \\ i_\beta(t) \end{bmatrix}$$

Sampling can be provided continuously, such as 256 times per phase period. q(t) is the value of the reactive power Q in case the corresponding system was stationary for a period around the sampling time t. However, as the system is not stationary q(t) is not an actual physical reactive power. But this is not important for the following comparison.

Subsequently p(t) and q(t) can be compared to the requested the real power P and reactive power Q. If p(t) does not agree with P and/or q(t) does not agree with Q the phase and/or amplitude of the internal converter voltage of the converter are adjusted correspondingly. The above described calculations of real power and reactive power apply whether the converter is being connected to the grid or whether the converter is already connected to the grid and in operation.

In general the invention applies equally well to converters with one or multiple phases. For multiple phase converters the process is simply applied to each phase, preferably simultaneously. The invention may be applied to converters such as, but not limited to, the back-to-back two-level voltage source converter, the matrix converter, the back-to-back transistor clamped three-level voltage source converter and the back-to-back diode clamped three-level voltage source converter.

In a preferred embodiment of the invention the synchronization of the converter and the grid is provided automatically. The process can for example be implemented in a computer controlled device, preferably comprising a PI control loop.

The invention preferably applies to connection between an electrical power source and a utility grid with inductive characteristics. This is the for example the case where the connection to the grid is through a transformer, whereby stray inductance in the transformer will make the connection inductive. The overhead electric transmission system is also inductive due to stray inductance in the aerial wires. In a system with inductive characteristics a voltage source converter will typically be applied.

However, the invention applies equally well to a connection between an electrical power source and a system with capacitive characteristics. In this case a current source converter will typically be applied. However, the general regulation of the converter is as described herein.

The system and method according to the invention relates to the connection of a converter to a utility grid and applies whether or not inductive elements, e.g. reactor(s), are present within the converter and/or between the converter and the utility grid. However, the main advantage of the invention is the possibility of reducing the size of or even completely avoiding the use of a reactor between the converter and the grid. Inductive elements might still be present, e.g. as filters.

Another pivotal point in the invention is that after the converter has been connected to the grid, measurement of the grid voltage is no longer necessary (it has been locked as the grid reference signal). In a situation where measurement of the grid voltage is necessary to adjust the converter characteristics to synchronize with the grid, a reactor between the converter and the grid is essential in order to measure the grid voltage.

A plurality of converter types is presently on the market. One of the most common converters today is the two-level IGBT based converter. However, three level and multi-level converters are beginning to penetrate the market because they can handle greater voltages than two-level converters. The system and method according to the invention applies equally well to one phase converters, three phase converters, switched mode converters, two-level, three level and multi-level converters.

Converters are often used for connecting variable electrical power sources to the utility grid, because the varying power from the sources must be converted to a stable sinusoidal AC current to fit with the utility grid. Thus, in a preferred embodiment of the invention relates to connection, interface and/or control of a converter to a utility grid where the converter is connected to a variable electrical power source. A wind turbine is an example of a variable electrical power source and the system and method according to the invention applies equally well whether the wind turbine comprises the common four pole generator or the wind turbine generator of the future: the multi-pole generator. Fuel cells, photovoltaic devices and wave energy devices are other examples of variable electrical power sources wherein the system and method according to the invention can be applied when integrating the sources with the utility grid.

In a further embodiment of the invention the system and the method can be applied to a backup power system. An uninterruptible power supply (UPS), also known as a continuous power supply (CPS) or a battery backup is a device which maintains a continuous supply of electric power to connected equipment by supplying power from a separate source when utility power is not available. It differs from an auxiliary power supply or standby generator, which does not provide instant protection from a momentary power interruption, however could be used to provide uninterrupted power to equipment for 1-20 minutes until a generator can be turned on. Integrated systems that have UPS and standby generator components are often referred to as emergency power systems. On-line UPS systems are commonly equipped with converters (or double-converters) for accepting an AC input, rectifying to DC for passing through the battery (or battery strings), then inverting back to AC for powering the protected equipment. A reactor is then normally present to consume the reactive power and for large scale electrical backup systems a considerably large reactor is necessary. By applying the system and method according to the invention, an electrical backup power system can substantially reduce the size of the reactor and may even completely avoid the use of a reactor, thereby reducing the power loss in the system and reducing the size and the weight of the system.

A further aspect of the invention relates to a computer program product including a computer readable medium, said computer readable medium having a computer program stored thereon, said program for connecting a converter to an electrical power grid, and comprising program code for conducting all the steps of any of the abovementioned methods.

Yet a further aspect of the invention relates to a computer program product including a computer readable medium, said computer readable medium having a computer program stored thereon, said program for controlling a converter connected to an electrical power grid, and comprising program code for conducting all the steps of any of the abovementioned methods.

Modern converters are typically provided with and controlled by computer software, possibly integrated in a signal processor. The present invention may therefore be applied to existing converters by simply updating the regulation software of the converters.

DRAWINGS

The invention will now be explained in greater detail with reference to the drawings in which.

DESCRIPTION OF DRAWINGS

Figure 1:
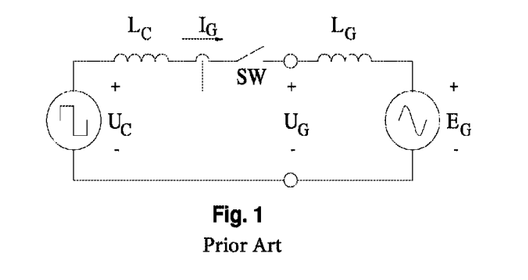
FIG. 1 is an illustration of a typical connection between a converter and a grid, illustrated for one phase only.

FIG. 1 illustrates a typical connection between a converter with a voltage $U_C$ and an inductive grid with a voltage $E_G$ where $L_G$ is the inductance of the grid. $I_G$ is the current flowing from the converter to the grid. The inductor (reactor) $L_C$ consumes the reactive power of the converter, however by the system and method according to the invention use of the reactor $L_C$ can be avoided.

Figure 2:
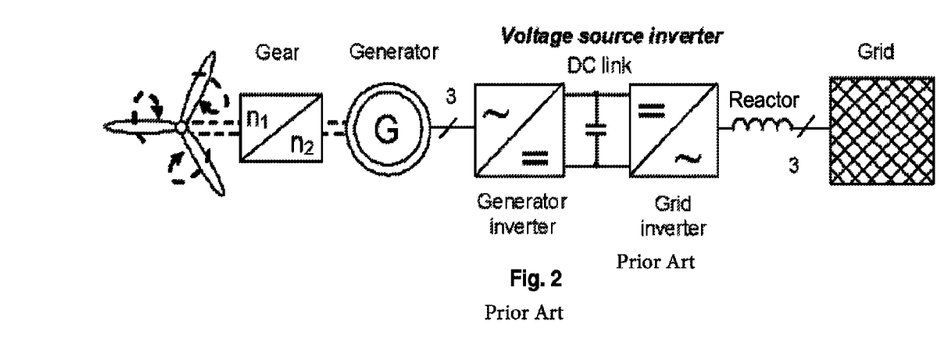
FIG. 2 is an illustration of normal setup of a wind turbine connection with a utility grid.

FIG. 2 illustrates a classical wind turbine setup with the rotor, the gear, a generator and a converter to convert the varying electrical power from the wind turbine to a stable AC current suited for the grid. In this example the converter is a so called voltage source converter with a generator converter (AC-DC) and a grid converter (DC-AC). The connection to the grid is provided through the reactor. The converter and the reactor provide a seamless integration with the reactor consuming the reactive power of the converter. A transformer (not shown in the figure) is typically also necessary between the reactor and the grid to transform the low-voltage signal into a high-voltage signal for the grid.

Figure 3:
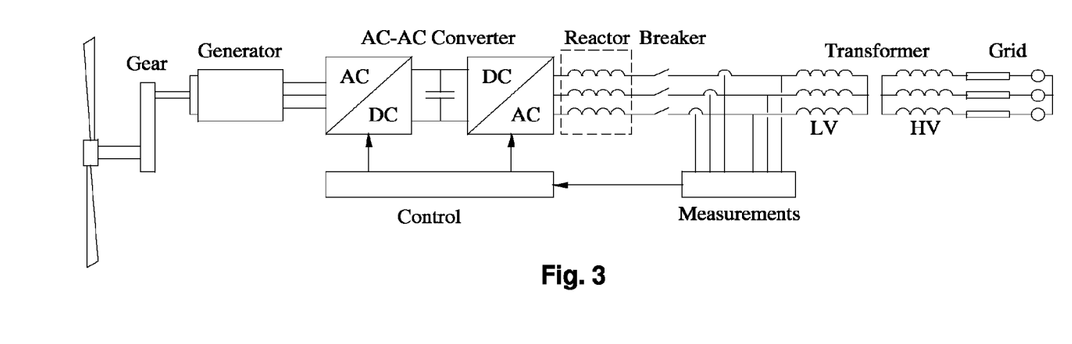
FIG. 3 is an illustration wind turbine setup supplied with measurement and control according to the invention.

FIG. 3 illustrates the corresponding setup when one embodiment of the system according to the invention is applied. Unlike FIG. 2 a breaker is introduced between the grid and the converter, measurements on all three phases are obtained on the connection between the converter and the grid and a control part for adjusting the converter according to the result of the measurements are introduced. The reactor after the converter is then not necessary for a seamless integration of the wind turbine with the utility grid.

Figure 4:
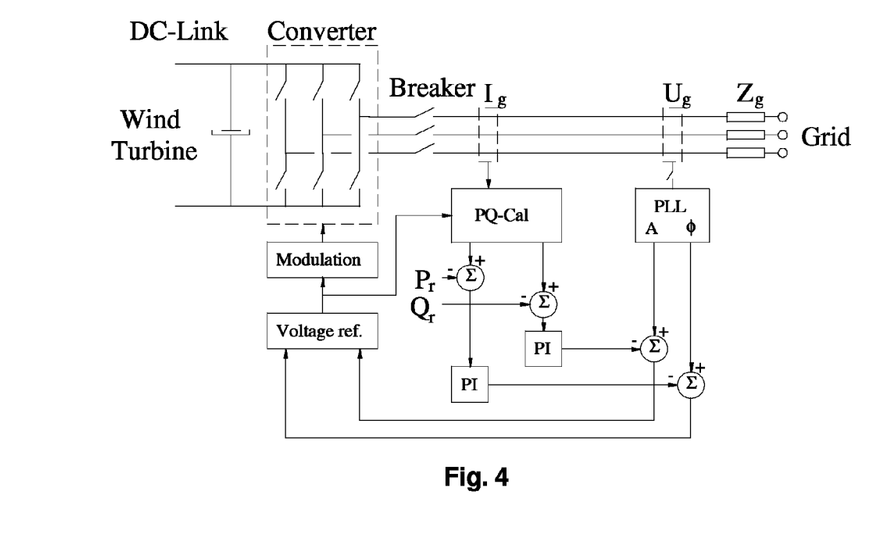
FIG. 4 illustrates the control loop according to one embodiment of the invention.

FIG. 4 shows a diagram of one embodiment of a system according to the invention where a converter is connected to the grid without use of a reactor. A PLL locks the grid reference signal $U_g$ in amplitude A and phase $\phi$ and provides a internal converter voltage to the modulation of the converter. Measurement of the current $I_g$ provides the real power $P_r$ (also referred to as p(t) above) and the reactive power $Q_r$ (also referred to as q(t) above) of the signal from the converter. PI circuits provide adjustment of the phase and/or the amplitude of the internal converter voltage. Thus a self-regulating loop to interface the converter to the grid is provided.

1. Open the breaker and measure the amplitude and phase of the idle voltage $U_G$ of the grid. The measured idle characteristics of the grid $U_G$ is subsequently referred to as the grid reference signal and any connected source supplying electrical energy at that point must be synchronized with this grid reference signal.
2. Provide a lock at the measured amplitude and phase (i.e. the grid reference signal), preferably by means of a PLL. This lock will then be provided as an internal reference.
3. Close the breaker.
4. Measure the current $I_G$ which is flowing between the converter and the grid. Knowing this measured current $I_G$ and the internal converter voltage, the real power and reactive power exchanged between the converter and the grid can be calculated.
5. If the calculated real power and reactive power are not consistent with the requested P and Q, the internal converter voltage can be adjusted in amplitude and/or phase.
6. Points 4 and 5 are repeated until the converter signal is consistent with the grid reference signal, whereby the converter has been interfaced with the grid.

Figure 5:
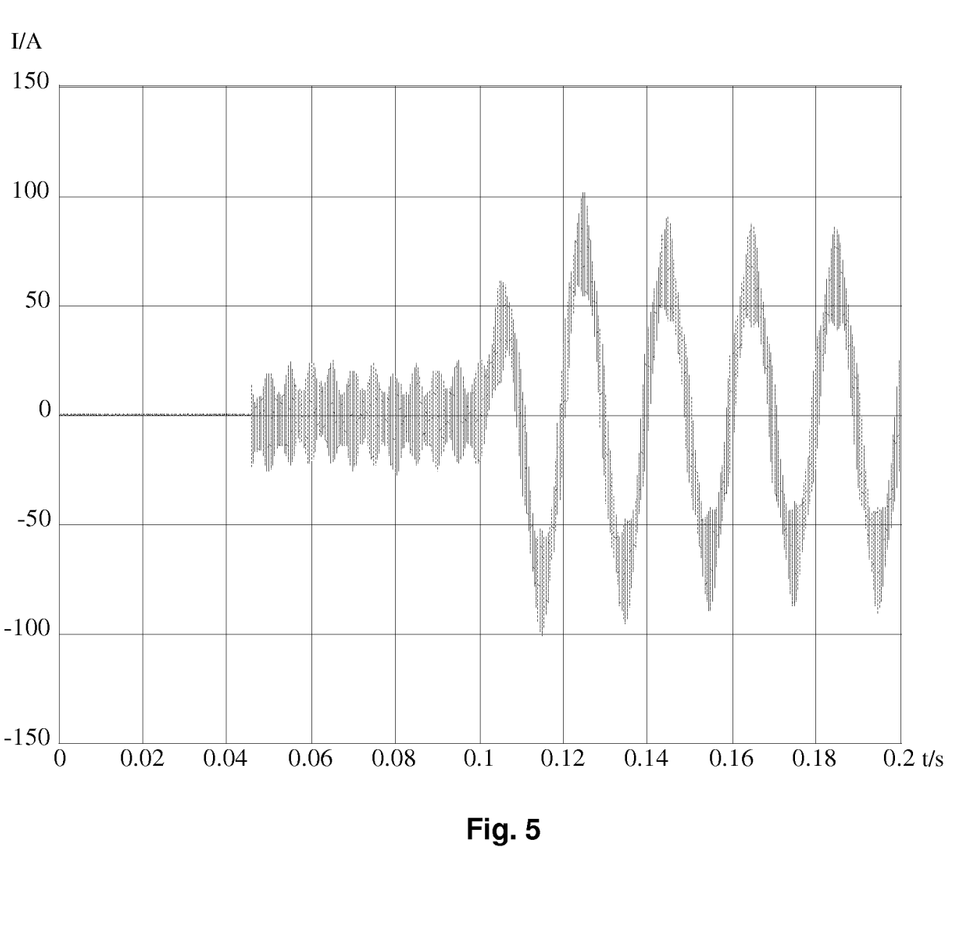
FIG. 5 shows simulation results of grid current.

FIG. 5 shows the result of a simulation of the AC current $I_G$ (in amps) as a function of the time (in seconds) when the converter is connected to the grid. The converter is connected at time t=0.04 s. The period between time t=0 and time t=0.04 s is used for providing a grid reference signal in a PLL. At time t=0.1 s the power at the DC side of the converter is instantaneously increased from 0 to 30 kW and the figure shows how one phase of the current $I_G$ develops over time.

Figure 6:
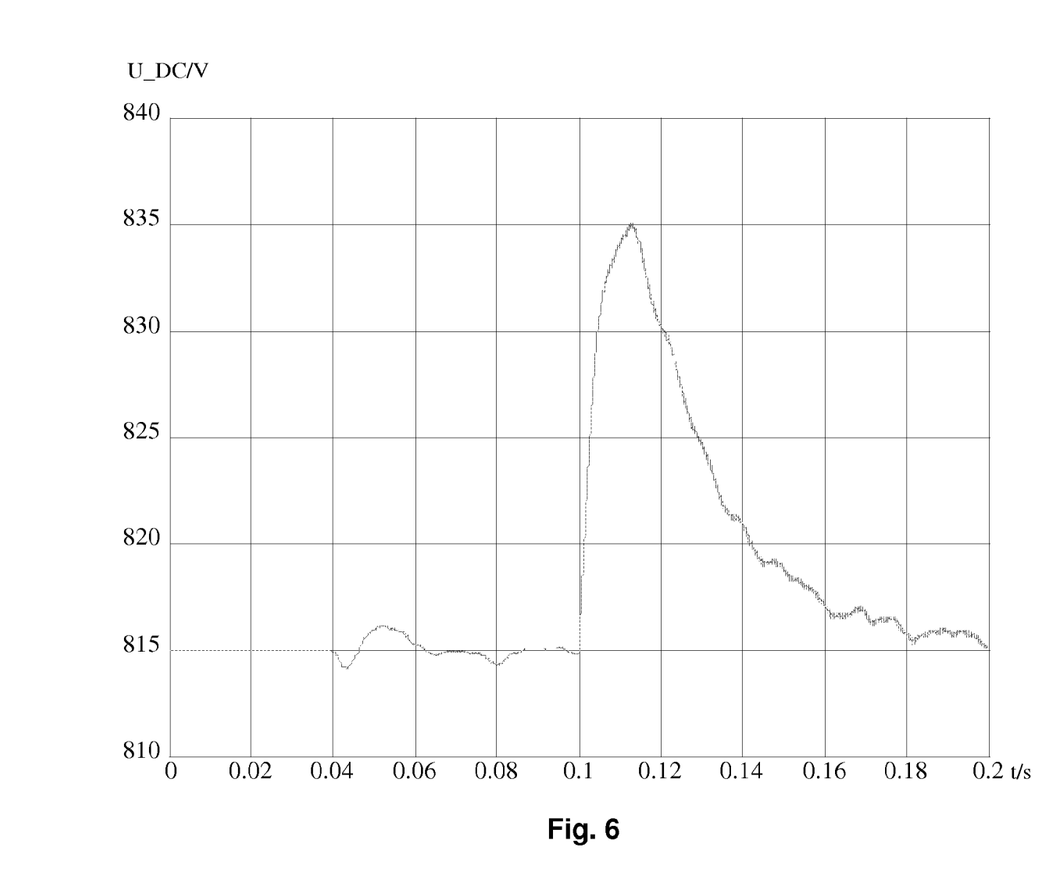
FIG. 6 shows simulation results of the DC voltage of a converter.

FIG. 6 shows a result of the simulation of the converter DC voltage (in volts) as a function of the time (in seconds). Similar to FIG. 5 the converter is connected at time t=0.04 s. At time t=0.1 s the power at the DC side of the converter is instantaneously increased from 0 to 30 kW and FIG. 6 shows the steep increase at time t=0.1 s in converter voltage. However the converter is back to the starting point at time t=0.2 s. Thus, in the simulated example in FIGS. 5 and 6 the synchronization process between the converter and the grid is completed in 0.2 seconds.

Further Details of the Invention

A further embodiment of the invention relates to a method for connecting a converter to an electrical power grid, said method comprising the steps of:
a) providing a grid reference signal by measuring the amplitude and the phase of the grid voltage,
b) providing an internal voltage reference as the grid reference signal,
c) connecting the converter to the grid,
d) measuring a current from the converter to the grid,
e) calculating the real power and the reactive power exchanged between the converter and the grid based on the internal voltage reference and the current obtained in step d),
f) if said real and/or reactive power is different from the grid reference signal the voltage of the converter is adjusted by changing the phase and/or the amplitude of the internal voltage reference, and
g) repeating steps d) to f) until the real and/or reactive power equals the grid reference signal,
thereby interfacing the converter with the electrical power grid.

Another embodiment of the invention relates to a method for controlling a converter connected to an electrical power grid, said electrical power grid having a grid reference signal in terms of phase and amplitude, said method comprising the steps of:

a) measuring a current from the converter to the grid,
b) calculating the real power and the reactive power exchanged between the converter and the grid based on an internal voltage reference and the current obtained in step a),
c) if said real and/or reactive power is different from the grid reference signal the voltage of the converter is adjusted by changing phase and/or amplitude of the internal voltage reference, and
d) repeating steps a) to c) until the real and/or reactive power equals the grid reference signal,
thereby maintaining synchronization between the converter and the electrical power grid When a reactor is used in a converter system a significant amount of electrical energy is dissipated and lost in the reactor, mostly due to electrical resistance and magnetic loss in the reactor. For example: For a wind turbine system there will be a loss of power between the generator in the wind turbine and the grid: Power loss due to resistance in the cables, power loss due to switching in the converter, power loss in the reactor and the like. The power loss in the reactor accounts for approx. 25% of the power lost from the generator to the grid. Therefore a reduction of size of the reactor or even total avoidance of a reactor would increase the energy efficiency of converter systems and thereby increase the efficiency of electrical power sources. Furthermore, the reactor may account for 20% to 40% of the total weight of a wind turbine solution and possibly one fourth of the cost of a converter system.

In common two-level converter systems employing reactors the switch frequency of the converter is in the range of 2-4 kHz. The power loss in a converter scales with the switch frequency, because every time a "switch" takes place a small amount of power is lost. However, with the present method and system the switch frequency of the converter should preferably be raised to a range of 5-10 kHz, such as 8 kHz, thereby slightly increasing the energy loss in the converter. Raising the switch frequency of the converter is at least partly provided to reduce the amplitude of the harmonics in the system. However, there are several advantages related to an increased converter switch frequency. First of all an increased switch frequency provides a converter with a quicker response, i.e. changes in the system can be addressed and corrected faster. Furthermore the converter can be an active filter, filtering out unwanted frequencies and/or harmonics in the signal.

An alternative to raising the switch frequency in the converter is to use three-level or multi-level converters.

In the future the converters are going to be key components in controlling and adjusting utility grids and demands and requirements for converters are constantly increased. The present invention opens for a redesign of converters. However, at the same time the present invention can be applied to existing converter systems.

The present invention applies to anywhere a converter must be connected to a utility grid. However, the invention is most relevant above a maximum power through the converter of approximately 1 MW. Above approx. 1 MW the requirements for the quality factor of the reactor results in a large size reactor providing a motive for avoiding the reactor.

Further Definitions and Background Relating to the Invention

Renewable Energy Sources

The contribution of a renewable power source to the total power generation becomes more and more important. A converter is practically always used for interfacing this Green Power Source to the utility-grid. The control of the energy flowing from the DC source, which is corresponding to an arbitrary renewable power source (wind turbine, photovoltaic cell, fuel cell, etc), to the grid must be done in order to track the maximum power point and to maintain a sinusoidal grid current with low harmonic distortion and a high power factor. In order to lower the transmitted high frequency current ripple, due to the operation of the inverter, a passive filter consisting of inductors or combination of capacitors and inductors can be inserted between the inverter operating as a stiff voltage source and the grid that operates also as a stiff voltage source.

Grid Management

Induction generators often used for wind power projects require reactive power for excitation, so substations used in wind-power collection systems include substantial capacitor banks for power factor correction. Different types of wind turbine generators behave differently during transmission grid disturbances, so extensive modelling of the dynamic electromechanical characteristics of a new wind farm is required by transmission system operators to ensure predictable stable behaviour during system faults. In particular, induction generators cannot support the system voltage during faults, unlike steam or hydro turbine-driven synchronous generators (however properly matched power factor correction capacitors along with electronic control of resonance can support induction generation without grid). Doubly-fed machines, or wind turbines with solid-state converters between the turbine generator and the collector system, have generally more desirable properties for grid interconnection. Transmission systems operators will supply a wind farm developer with a grid code to specify the requirements for interconnection to the transmission grid. This will include power factor, constancy of frequency and dynamic behaviour of the wind farm turbines during a system fault.

Power Factor Correction

Power factor correction (PFC) is the process of adjusting the characteristics of electric loads in order to improve power factor so that it is closer to unity. Power factor correction may be applied either by an electrical power transmission utility to improve the stability and efficiency of the transmission network; or, correction may be installed by individual electrical customers to reduce the costs charged to them by their electricity supplier. A high power factor is generally desirable in a transmission system to reduce transmission losses and improve voltage regulation at the load.

It is often possible to adjust the power factor of a system to very near unity. This practice is known as power factor correction and is achieved by switching in or out banks of inductors or capacitors. For example the inductive effect of motor loads may be offset by locally connected capacitors. When reactive elements supply or absorb reactive power near the point of reactive loading, the apparent power draw as seen by the source is reduced and efficiency is increased. The reactive elements can create voltage fluctuations and harmonic noise during connection and disconnection procedures, and they will supply or sink reactive power regardless of whether there is a corresponding load operating nearby, increasing the system's no-load losses. In a worst case, reactive elements can interact with the system and with each other to create resonant conditions, resulting in system instability and severe overvoltage fluctuations. As such, reactive elements cannot simply be applied at will, and power factor correction is normally subject to engineering analysis.

Linear Loads

Electrical loads consuming alternating current power consume both real power, which does useful work, and reactive power, which dissipates no energy in the load and which returns to the source on each alternating current cycle. The vector sum of real and reactive power is the apparent power. The ratio of real power to apparent power is the power factor, a number between 0 and 1 inclusive. The presence of reactive power causes the real power to be less than the apparent power, and so, the electric load has a power factor of less than 1.

The reactive power increases the current flowing between the power source and the load, which increases the power losses through transmission and distribution lines. This results in additional costs for power companies. Therefore, power companies require their customers, especially those with large loads, to maintain their power factors above a specified amount (usually 0.90 or higher) or be subject to additional charges. Electricity utilities measure reactive power used by high demand customers and charge higher rates accordingly. Some consumers install power factor correction schemes at their factories to cut down on these higher costs.

Power factor correction brings the power factor of an AC power circuit closer to 1 by supplying reactive power of opposite sign, adding capacitors or inductors which act to cancel the inductive or capacitive effects of the load, respectively. For example, the inductive effect of motor loads may be offset by locally connected capacitors. Sometimes, when the power factor is leading due to capacitive loading, inductors (also known as reactors in this context) are used to correct the power factor. In the electricity industry, inductors are said to consume reactive power and capacitors are said to supply it, even though the reactive power is actually just moving back and forth between each AC cycle.

Non-Linear Loads

Non-linear loads create harmonic currents in addition to the original AC current. Addition of linear components such as capacitors and inductors cannot cancel these harmonic currents, so other methods such as filters or active power factor correction are required to smooth out their current demand over each cycle of alternating current and so reduce the generated harmonic currents.

Switched-Mode Power Supplies

A typical switched-mode power supply first makes a DC bus, using a bridge rectifier or similar circuit. The output voltage is then derived from this DC bus. The problem with this is that the rectifier is a non-linear device, so the input current is highly non-linear. That means that the input current has energy at harmonics of the frequency of the voltage.

This presents a particular problem for the power companies, because they cannot compensate for the harmonic current by adding simple capacitors or inductors, as they could for the reactive power drawn by a linear load. Many jurisdictions are beginning to legally require power factor correction for all power supplies above a certain power level.

The simplest way to control the harmonic current is to use a filter: it is possible to design a filter that passes current only at line frequency (e.g. 50 or 60 Hz). This filter reduces the harmonic current, which means that the non-linear device now looks like a linear load. At this point the power factor can be brought to near unity, using capacitors or inductors as required. This filter requires large-value high-current inductors, however, which are bulky and expensive.

UPS

An uninterruptible power supply (UPS), also known as a continuous power supply (CPS) or a battery backup is a device which maintains a continuous supply of electric power to connected equipment by supplying power from a separate source when utility power is not available. It differs from an auxiliary power supply or standby generator, which does not provide instant protection from a momentary power interruption, however could be used to provide uninterrupted power to equipment for 1-20 minutes until a generator can be turned on. Integrated systems that have UPS and standby generator components are often referred to as emergency power systems.

There are three distinct UPS types:
Off-line: remains idle until a power failure occurs, and then switches from utility power to its own power source, almost instantaneously.
Line-interactive.
On-line: continuously powers the protected load from its energy reserves stored in a lead-acid battery or flywheel, while simultaneously replenishing the reserves from the AC power. It also provides protection against all common power problems, and for this reason it is also known as a power conditioner and a line conditioner.

While not limited to safeguarding any particular type of equipment, a UPS is typically used to protect computers, telecommunication equipment or other electrical equipment where an unexpected power disruption could cause injuries, fatalities, serious business disruption or data loss. UPS units come in sizes ranging from units which will back up a single computer without monitor (around 200 VA) to units which will power entire data centers or buildings (several megawatts).

The general categories of modern UPS systems are on-line, line-interactive, and standby. An on-line UPS uses a "double conversion" method of accepting AC input, rectifying to DC for passing through the battery (or battery strings), then inverting back to AC for powering the protected equipment. A line-interactive UPS maintains the inverter in line and redirecting the battery's DC current path from the normal charging mode to supplying current when power is lost. In a standby ("off-line") system the load is powered directly by the input power and the backup power circuitry is only invoked when the utility power fails.

The invention claimed is:

1. A system for connecting a converter to an electrical power grid operating with a predefined real power P and a predefined reactive power reference Q, said system comprising:
a) means for providing a grid reference signal, said means for providing a grid reference signal being operative to: provide a sampling connection between the grid and a Phase Locked Loop entity and to measure the amplitude and the phase of the grid voltage,
b) means for setting an internal converter voltage to be the grid reference signal using the Phase Locked Loop entity,
c) means for connecting the converter to the grid,
d) means for measuring a current from the converter to the grid,
e) means for calculating the real power p(t) and/or the reactive power q(t) exchanged between the converter and the grid based on the internal converter voltage and the current measured by means d),
f) means for determining if said real power p(t) is different from the predefined power P and/or if said reactive power q(t) is different from the predefined reactive power reference Q,
g) means for adjusting the converter by changing the phase and/or the amplitude of the internal converter voltage, if it has been determined by means f) that said real power p(t) is different from the predefined power P and/or if said reactive power q(t) is different from the predefined reactive power reference Q, said means for adjusting the converter operating on a repeated basis until the real power p(t) equals P and/or the reactive power q(t) equals Q whereby the converter is interfaced with the electrical power grid without use of an inductor.

2. The system of claim 1, wherein the system is operative to regulate a three-phase AC system and wherein the system is operative to transform the three AC quantities of the internal converter voltage and the measured current to DC quantities by means of a suitable mathematical transformation.

3. The system of claim 2, wherein the three AC quantities of the internal converter voltage $e_{a,b,c}$ at sampling time t is transformed to two DC quantities $e_{\alpha,\beta}$ according to the following formula:

$$\begin{bmatrix} e_\alpha(t) \\ e_\beta(t) \end{bmatrix} = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} e_a(t) \\ e_b(t) \\ e_c(t) \end{bmatrix}.$$

4. The system of claim 2, wherein the three AC quantities of the measured current $i_{a,b,c}$ at sampling time t is transformed to two DC quantities $i_{\alpha,\beta}$ according to the following formula:

$$\begin{bmatrix} i_\alpha(t) \\ i_\beta(t) \end{bmatrix} = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} i_a(t) \\ i_b(t) \\ i_c(t) \end{bmatrix}.$$

5. The system of claim 2, wherein the real power p(t) and the reactive power q(t) at sampling time t is calculated according to the following formula:

$$\begin{bmatrix} p(t) \\ q(t) \end{bmatrix} = \frac{3}{2}\begin{bmatrix} e_\alpha(t) & e_\beta(t) \\ -e_\beta(t) & e_\alpha(t) \end{bmatrix} \cdot \begin{bmatrix} i_\alpha(t) \\ i_\beta(t) \end{bmatrix}.$$

6. The system of claim 1, wherein the point of common coupling (PCC) between the power grid and the converter is provided at the converter output.

7. The system of claim 1, wherein the system includes means whereby the grid reference signal is locked by a Phase Locked Loop.

8. The system of claim 1, wherein the system is operative to connect the converter is furthermore connected to at least one electrical power source.

9. A method for controlling a converter connected to an electrical power grid operating with a predefined real power P and a predefined reactive power reference Q, said method comprising the steps of:

a) providing a grid reference signal by providing a sampling connection between the grid and a Phase Locked Loop entity and by measuring the amplitude and the phase of the grid voltage, b) using the Phase Locked Loop entity to set an internal converter voltage to be the grid reference signal, c) measuring a current from the converter to the grid, d) calculating the real power p(t) and/or the reactive power q(t) exchanged between the converter and the grid based on an internal converter voltage and the current obtained in step c), e) if said real power p(t) is different from the predefined real power P and/or if said reactive power q(t) is different from the predefined reactive power Q, the converter is adjusted by changing phase and/or amplitude of the internal converter voltage, and f) repeating steps c) to e) until the real power p(t) equals P and/or the reactive power q(t) equals Q, thereby maintaining synchronization between the converter and the electrical power grid, whereby said converter is connected to an electrical power grid without use of an inductor.

10. A method according to claim 9, further comprising the step of continually repeating steps c) to e) or c) to f) to correct for variations in operating conditions in terms of P and/or Q.

11. A method according to claim 9, wherein the regulation is provided in a three-phase AC system and wherein the three AC quantities of the internal converter voltage and the measured current are transformed to DC quantities by means of a suitable mathematical transformation.

12. A method according to claim 9, wherein the converter is furthermore connected to at least one electrical power source.

13. A method according to claim 9, whereby a plurality of said steps are provided automatically.

* * * * *